United States Patent Office 2,913,483
Patented Nov. 17, 1959

2,913,483

LOWER ALKYLPHENYL 2,4-DICHLOROBENZOATES

David A. Gordon, Midland, Mich., assignor to The Dow Chemical Company, Midland, Mich., a corporation of Delaware No Drawing. Application May 8, 1958
Serial No. 733,853

10 Claims. (Cl. 260—476)

The present invention is concerned with lower alkyl phenyl 2,4-dichlorobenzoates and is particularly directed to compounds corresponding to the formula

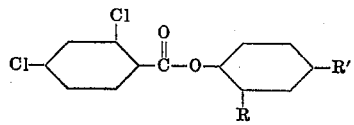

wherein R represents hydrogen or lower alkyl and R' represents lower alkyl. The term "lower alkyl" is used in the present specification and claims to designate an alkyl radical containing from 1 to 8 carbon atoms, inclusive. The present compounds are liquids or solids somewhat soluble in many common organic solvents and of very limited solubility in water. They are useful in treatment of soil to improve its properties for growing desired plants, and are adapted to be employed in the control of many parasitic organisms such as fungi.

The new compounds are prepared by causing a reaction between 2,4-dichlorobenzoyl chloride and a phenol reactant corresponding to the formula

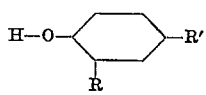

The reaction is carried out in a liquid reaction medium and in the presence of a hydrogen chloride neutralizing agent. The reaction is exothermic and takes place smoothly at the temperature range of from 10° to 40° C. with formation of desired product and hydrogen chloride of reaction. This hydrogen chloride appears in the reaction mixture as the salt of reaction between hydrogen chloride and the hydrogen chloride neutralizing agent. The temperature may be controlled by regulating the rate of contacting the reactants and by cooling. Good results are obtained when employing substantially equimolecular proportions of 2,4-dichlorobenzoyl chloride, phenol reactant, and an amount of the hydrogen chloride neutralizing agent at least as great as that stoichiometric with acid chlorine of the dichlorobenzoyl chloride.

In carrying out the reaction, the 2,4-dichlorobenzoyl chloride is added slowly portionwise to a mixture consisting of phenol reactant and hydrogen chloride neutralizing agent dispersed in a liquid reaction medium which is preferably water. The neutralizing agent may be a carbonate, bicarbonate, or preferably a hydroxide of an alkali metal in which case an amount at least as great as that equimolecular with dichlorobenzoyl chloride reactant is employed. The contacting may be carried out with cooling and takes place in the reaction temperature range. Upon completion of the reaction, the desired product occurs in the aqueous reaction medium as a distinct organic phase, and is separated from aqueous reaction mixture in a separatory funnel or by filtration, according to its physical state, and the resulting product purified, if desired, in known ways, such as by fractional distillation, crystallization from solvent and the like.

The following examples illustrate the invention, but are not to be considered as limiting.

*Example 1.—2,4-dimethylphenyl 2,4-dichlorobenzoate*

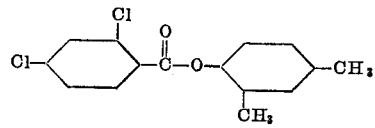

2,4-dichlorobenzoyl chloride (209 grams; 1 mole) was added dropwise over a period of 45 minutes to a mixture consisting of 44 grams (1.1 mole) sodium hydroxide and 121 grams (1.0 mole) 2,4-dimethylphenol dispersed in 2 liters of water. The addition was carried out with stirring and cooling and at a temperature of from 20° to 40° C. Stirring was thereafter continued and the mixture maintained at a temperature of from 20° to 40° C. for 3 hours. During the reaction period the mixture divided into an aqueous by-product layer and an organic product phase. The organic phase was removed in a separatory funnel, and then successively diluted with diethyl ether, water washed, dried, and the ether solvent was removed by vaporization. The resulting solid product was recrystallized from ethanol to obtain a purified 2,4-dimethylphenyl 2,4-dichlorobenzoate product melting at 50.0 to 51.4° C.

*Example 2.—4-methylphenyl 2,4-dichlorobenzoate*

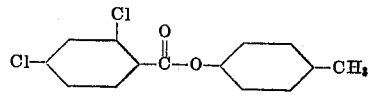

In a procedure similar to that of Example 1, a 4-methylphenyl ester product of 2,4-dichlorobenzoic acid was prepared by reacting approximately equimolecular quantities of 4-methylphenol and 2,4-dichlorobenzoyl chloride, in the presence of slightly more than an equimolecular amount of sodium hydroxide. As a result of these operations there was obtained a 4-methylphenyl ester product of 2,4-dichlorobenzoic acid as a white crystalline solid melting at 61.8 to 62.5° C.

*Example 3.—4-tertiarybutylphenyl 2,4-dichlorobenzoate*

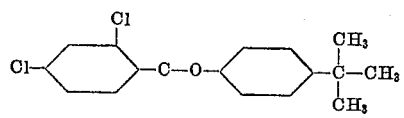

2,4-dichlorobenzoyl chloride (104 grams; 0.5 mole) was added dropwise over a period of an hour to a mixture consisting of 75 grams (0.5 mole) of 4-tertiarybutylphenol and 24 grams (0.6 mole) sodium hydroxide dispersed in 1 liter of water. The addition was carried out with stirring and at a temperature of from 20° to 40° C. Stirring was thereafter continued and the reaction mixture maintained at a temperature of approximately 20°–25° C. for 3 hours. During the reaction time, the mixture divided into an aqueous by-product phase and an organic product phase. The supernatant product phase was diluted with ether, removed in a separatory funnel, washed, dried, and solvent evaporated as described in Example 1. The resulting product was recrystallized from ethanol to obtain a purified 4-tertiarybutylphenol 2,4-dichlorobenzoate product as a crystalline solid melting at 64° to 65° C.

Example 4.—2,4-bis(1,1-dimethylpropyl)phenyl 2,4-dichlorobenzoate

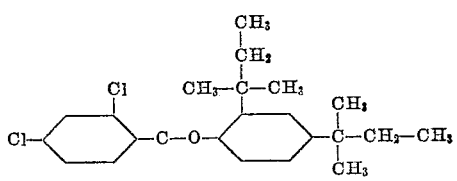

2,4-dichlorobenzoyl chloride (209 grams; 1 mole) was added dropwise over a period of 45 minutes to a mixture consisting of 234 grams (1.0 mole) of 2,4-bis(1,1-dimethylpropyl)phenol and 48 grams (1.2 mole) sodium hydroxide dispersed in 2 liters of water. The addition was carried out with stirring and at a temperature of from 20° to 40° C. Stirring was thereafter continued and the reaction mixture maintained at a temperature of approximately 20°–25° for 3 hours. During the reaction time the mixture divided into aqueous by-product and organic product phases. The organic product phase was diluted with 500 milliliters diethyl ether, removed in a separatory funnel, water-washed, dried, and fractionally distilled to obtain a 2,4-bis(1,1-dimethylpropyl)phenyl 2,4-dichlorobenzoate product as a colorless liquid boiling at 186° C. under 0.5 millimeters pressure, and having a refractive index $n/D$ of 1.5526 at 25° C.

Example 5.—4-(1,1,3,3-tetramethylbutyl)phenyl 2,4-dichlorobenzoate

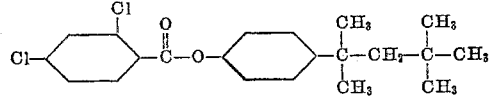

In a manner similar to that of Example 3, 4-(1,1,3,3-tetramethylbutyl)phenol, and 2,4-dichlorobenzoyl chloride in equimolecular proportions were reacted together in the presence of sodium hydroxide in slightly more than equimolecular proportion in an aqueous reaction medium. The procedure, including isolation and purification of the product, was carried out substantially as described in Example 3 except that the product was finally recrystallized from methanol. As a result of these operations there was obtained a 4-(1,1,3,3-tetramethylbutyl)phenyl 2,4-dichlorobenzoate product melting at 51–53° C.

The alkyl phenyl 2,4-dichlorobenzoates of the present invention are useful as germicides and are adapted to be employed as active toxicants in compositions for the control of insects. For such use, the compounds may be employed directly. Alternatively, they may be dispersed on inert finely divided solids and the resulting preparations employed as dusts. Also, such preparations may be dispersed in water with or without the aid of a wetting agent and the resulting aqueous suspensions employed as sprays. In other procedures, the compounds may be employed in solvents or as constituents of solvent-in-water and water-in-solvent emulsions or as aqueous dispersions which may be applied by spray, drench, or wash. In a representative operation, an aqueous dispersion containing 1 pound of 4-(1,1-dimethylpropyl)phenyl 2,4-dichlorobenzoate per hundred gallons of ultimate composition applied as a wetting spray gave commercially satisfactory kill of a population of Periplaneta americana.

In addition to the compounds specifically shown in the foregoing examples, 4-isopropylphenyl 2,4-dichlorobenzoate melts at 38°–40° C., 2,4-ditertiarybutylphenyl 2,4-dichlorobenzoate melts at 108°–108.5° C., 4-(1,1-dimethylpropyl)phenyl 2,4-dichlorobenzoate melts at 52°–53° C.

I claim:

1. A compound corresponding to the formula

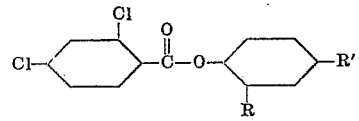

wherein R represents a member of the group consisting of hydrogen and R', and R' represents an alkyl group containing from 1 to 8 carbon atoms, inclusive.

2. 4-methylphenyl 2,4-dichlorobenzoate.
3. 2,4-dimethylphenyl 2,4-dichlorobenzoate.
4. 4-isopropylphenyl 2,4-dichlorobenzoate.
5. 4-tertiarybutylphenyl 2,4-dichlorobenzoate.
6. 2,4-ditertiarybutylphenyl 2,4-dichlorobenzoate.
7. 4(1,1-dimethylpropyl)phenyl 2,4-dichlorobenzoate.
8. 2,4-bis(1,1-dimethylpropyl)phenyl 2,4-dichlorobenzoate.
9. 4(1,1,3,3-tetramethylbutyl)phenyl 2,4-dichlorobenzoate.
10. A method of preparing a compound corresponding to the formula

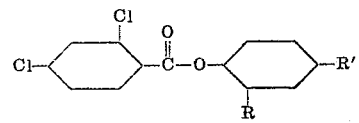

which comprises causing a reaction between a compound corresponding to the formula

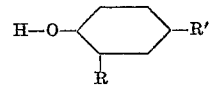

wherein R represents hydrogen or R'; and R' represents an alkyl group containing from 1 to 8 carbon atoms, inclusive, and 2,4-dichlorobenzoyl chloride in the presence of an alkali.

References Cited in the file of this patent

UNITED STATES PATENTS

| | | |
|---|---|---|
| 2,138,809 | Reiff et al. | Nov. 29, 1938 |
| 2,665,301 | Monroe et al. | Jan. 5, 1954 |